(12) United States Patent
Lazaravich et al.

(10) Patent No.: US 7,532,027 B2
(45) Date of Patent: May 12, 2009

(54) DELIBERATE DESTRUCTION OF INTEGRATED CIRCUITS

(75) Inventors: Robert Lazaravich, Chandler, AZ (US); Hugh Littlebury, Gilbert, AZ (US)

(73) Assignee: Adtron, Inc., Phoenix, AZ (US)

( * ) Notice: Subject to any disclaimer, the term of this patent is extended or adjusted under 35 U.S.C. 154(b) by 0 days.

(21) Appl. No.: 11/864,625

(22) Filed: Sep. 28, 2007

(65) Prior Publication Data

US 2009/0085602 A1 Apr. 2, 2009

(51) Int. Cl.
*H03K 19/00* (2006.01)
(52) U.S. Cl. ............................................. 326/8; 326/37
(58) Field of Classification Search ................ 326/8, 326/9, 37, 38
See application file for complete search history.

(56) References Cited

U.S. PATENT DOCUMENTS

| | | | |
|---|---|---|---|
| 3,882,323 A * | 5/1975 | Smolker .................... 327/525 |
| 4,384,229 A * | 5/1983 | Inoue et al. ................. 310/315 |
| 4,851,894 A * | 7/1989 | de Ferron et al. ........... 257/536 |
| 5,006,964 A * | 4/1991 | Ross et al. .................. 361/504 |
| 5,406,261 A | 4/1995 | Glenn |
| 5,736,777 A | 4/1998 | Shield et al. |
| 5,995,418 A | 11/1999 | Chen et al. |
| 6,166,960 A | 12/2000 | Marneweck et al. |
| 6,195,293 B1 | 2/2001 | Yun et al. |
| 6,320,787 B1 | 11/2001 | Ikeda |
| 6,335,879 B1 | 1/2002 | Matsubara et al. |
| 6,426,897 B1 | 7/2002 | Jung et al. |
| 6,525,970 B2 | 2/2003 | Wang et al. |
| 6,545,911 B2 | 4/2003 | Chou et al. |
| 6,563,741 B2 | 5/2003 | Mihnea et al. |
| 6,665,226 B2 | 12/2003 | Yoneya et al. |
| 6,721,208 B2 | 4/2004 | Jung et al. |
| 7,430,136 B2 | 9/2008 | Merry, Jr. et al. |
| 2001/0053095 A1 | 12/2001 | Jinbo |
| 2002/0012275 A1 | 1/2002 | Ahn et al. |
| 2002/0101765 A1 | 8/2002 | Mihnea et al. |
| 2003/0067809 A1 | 4/2003 | Wooldridge |
| 2003/0151952 A1 | 8/2003 | Gualandri et al. |
| 2005/0259469 A1 | 11/2005 | Salessi et al. |

FOREIGN PATENT DOCUMENTS

JP 2000181804 6/2000

* cited by examiner

*Primary Examiner*—Don P Le
(74) *Attorney, Agent, or Firm*—Snell & Wilmer, LLP (57) ABSTRACT

A method is provided for intentionally permanently disabling a target device. The target device comprises an integrated circuit having one or more electronic devices, where the target device is disabled by destroying at least one or more electronic devices. The method comprises charging at least one capacitor in an integrated circuit disabling device, detecting when at least one capacitor is charged, and selecting at least one target signal path associated with the target device for disabling. The method further includes connecting the integrated circuit disabling device to the target signal path and rapidly discharging at least one capacitor to the selected target signal path. The discharging step may apply a high energy impulse to destroy the one or more electronic devices of the target device.

25 Claims, 3 Drawing Sheets

DELIBERATE DESTRUCTION OF INTEGRATED CIRCUITS

FIELD

The subject of this disclosure may relate generally to systems, methods, and devices for the deliberate destruction of integrated circuits.

BACKGROUND

Solid-state devices are used in large quantities in electronics, including very high security equipment maintained by the military and security organizations. Equipment using sensitive information contained in integrated circuits may still be retrievable unless permanently disabled, so the integrated circuits should be deliberately and quickly destroyed to provide assurance that the information is not accessible.

Integrated circuits are quite susceptible to destruction by the incidental discharge of static electricity through the equipment. Nevertheless, the addition of static protection structures has greatly reduced the integrated circuits susceptibility to static discharge, and increased the difficulty of deliberate destruction.

Conventional methods for the deliberate destruction of devices employ large power supplies and capacitive discharge systems using bulky components that apply sustained current to the devices until destruction is achieved. For example, existing devices for deliberate destruction of circuits may employ power supplies of thousands of volts, even tens of thousands of volts, and capacitors of five thousand μF or more. Thus, prior methods of disabling integrated circuits are typically slower than desired, are too bulky, and not easily scaleable. Thus, new systems and methods for disabling integrated circuits are desirable.

SUMMARY OF INVENTION

A method is provided for intentionally permanently disabling a target device. The target device comprises an integrated circuit having one or more electronic devices, wherein disabling the target device comprises destroying at least one or more electronic devices. The method comprises charging at least one capacitor in an integrated circuit disabling device, detecting when the at least one capacitor is charged, and selecting at least one target signal path associated with the target device for disabling. The method further includes connecting the integrated circuit disabling device to the target signal path and rapidly discharging at least one capacitor to the selected target signal path. The discharging step may apply a high energy impulse to destroy the one or more electronic devices of the target device.

Furthermore, a system is provided for intentionally permanently disabling an integrated circuit device. The system may include a power supply, a central energy storage unit electrically connected to the power supply, and a target device electrically connected to the central energy storage unit. The target device comprises the integrated circuit device which comprises at least one electronic device and at least one target signal path. The system also includes a controller configured to destroy at least one electronic device by charging the central energy storage unit, and rapidly discharging the central energy storage unit to at least one target signal path. The controller is further configured to discharge a high energy impulse to destroy at least one electronic device of the target device, and the discharge rise time is characterized by a dV/dt of greater than 1.5 volts/nanosecond.

BRIEF DESCRIPTION OF THE DRAWINGS

These and other features, aspects and advantages of the present invention will become better understood with reference to the following description, appending claims, and accompanying drawings where:

DETAILED DESCRIPTION OF THE INVENTION

In accordance with an exemplary embodiment of the present invention, systems, devices, and methods are provided for, among other things, an integrated circuit disabling device. The following descriptions are not intended as a limitation on the use or applicability of the invention, but instead, are provided merely to enable a full and complete description of exemplary embodiments.

Figure 1:
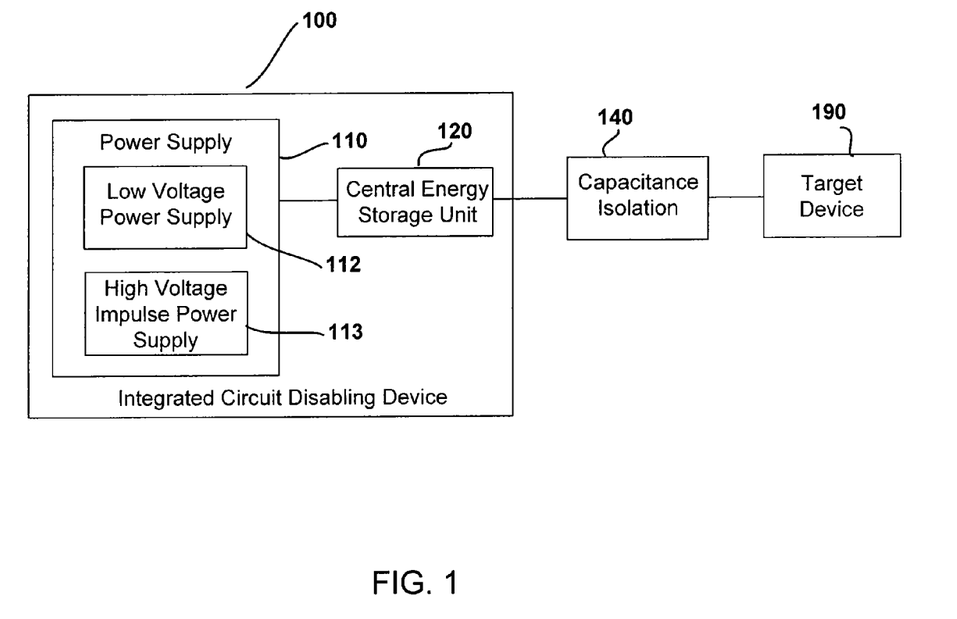
FIG. 1 illustrates, at high level, an integrated circuit disabling device, according to an exemplary embodiment.

In accordance with an exemplary embodiment of the present invention, and with reference to FIG. 1, an integrated circuit disabling device 100 (also described herein as disabling device 100) generally comprises a central energy storage unit 120 and a power supply 110. Power supply 110 is electrically connected to and charges central energy storage unit 120. Central energy storage unit 120 may also be electrically connected to a capacitance isolation unit 140, which is between central energy storage unit 120 and a target device 190. A controller unit (not shown) is connected to integrated circuit disabling device 100 and/or the other components. The controller unit is configured to control the charging and discharging of central energy storage unit and testing related thereto.

In an exemplary embodiment, integrated circuit disabling device 100 is located near target device 190. For example, in one exemplary embodiment, disabling device 100 is located on the same board as target device 190. In other exemplary embodiments, disabling device 100 is an integral part of target device 190 or is located on a separate board from target device 190. In one exemplary embodiment, the distance between integrated circuit disabling device 100 and target device 190 is minimized in order to reduce the inductance resulting from the physical connection.

In accordance with an exemplary embodiment of the present invention, integrated circuit disabling device 100 is configured to cause central energy storage unit 120 to discharge a large current through target device 190. Current art provides two methods for current discharge through a target device. When space allows, a large bulky apparatus is used to create a large current discharge. When space is constrained, discharging a relatively small current over a relatively long period of time is employed. In contrast, in various exemplary embodiments of the present invention, a relatively high current is discharged within a relatively short period of time. Moreover, in an exemplary embodiment this is done with a device that fits within a very constrained space.

Central energy storage unit 120 in this exemplary embodiment comprises a series of small capacitors. For example, central energy storage unit 120 may comprise 1-100 small capacitors. In another exemplary embodiment, central energy storage unit 120 comprises 6-12 small capacitors. In another exemplary embodiment, central energy storage unit 120 is comprised of 14 small capacitors. However, any number of capacitors may be used that provide sufficient power and are also able discharge energy quickly. Furthermore, in an exemplary embodiment, central energy storage unit 120 comprises a series of small capacitors connected in parallel.

In accordance with an exemplary embodiment, the capacitors of central energy storage unit 120 are multi-layer ceramic capacitors. However, capacitors of other construction types may also be used. For example, central energy storage unit 120 may comprise aluminum metal polymer capacitors or tantalum capacitors. Moreover, central energy storage unit 120 may comprise any suitable type of capacitor that is configured to discharge quickly and not be large and/or bulky.

In accordance with further exemplary embodiments of the present invention, the capacitors of central energy storage unit 120 comprise a capacitance of around 3 μF each. In other exemplary embodiments, the capacitance is less than 20 μF each or in the range of 0.1 μF to 100 μF each. Furthermore, the capacitors may comprise other capacitances suitable for delivering a relatively high amount of energy in a relatively short period of time. That said, it has been found that a capacitance around 3 μF each works well.

In yet a further exemplary embodiment, the capacitors of central energy storage unit 120 are polarized or non-polarized capacitors. The non-polarized capacitors are configured to be charged in either direction (positively or negatively). Charging central energy storage unit 120 positively and/or negatively allows for forward and/or backward breaking of electrical components of target device 190.

In accordance with another exemplary embodiment, central energy storage unit 120 comprises low Equivalent Series Resistance (ESR) capacitors, i.e., capacitors having low impedance. The lower the ESR of the unit, the higher the instantaneous current that is available for discharge into the target device. Thus, the capacitors may, for example, have an ESR of 0 to 1 Ω each, 50 to 500 mΩ each, or 300 mΩ each. As an example, with the capacitors of 300 mΩ each, ten capacitors in parallel will produce a 30 mΩ ESR. Other suitable ESR values may also be used. In accordance with various aspects of the present invention, configuring central energy storage unit 120 with low ESR capacitors enables those capacitors to be quickly charged and discharged; and because of the ability to discharge the capacitor very quickly, a lower voltage power supply may be used and still achieve the goal of disabling target device 190.

In a further exemplary embodiment, at least one central energy storage unit 120, for example the capacitor types mentioned within, is located along the discharge path of disabling device 100.

In accordance with one exemplary embodiment, the capacitor comprises a Murata GRM32DR71H335KA88L capacitor. Furthermore, any other capacitor may be used that can be quickly charged and discharged, has low impedance, is a high energy source, and/or is non-polarized.

As mentioned above, capacitance isolation unit 140 is connected between central energy storage unit 120 and target device 190. In an exemplary embodiment, capacitance isolation unit 140 is a diode. Furthermore, capacitance isolation unit 140 may comprise a Zener diode. In another exemplary embodiment, capacitance isolation unit 140 comprises a diode pair in parallel oppositely oriented from each other. Furthermore, capacitance isolation unit 140 may be any device configured to capacitively isolate disabling device 100 (and specifically, for example, capacitance associated with switch 8 of FIG. 2) from target device 190. In general, capacitance isolation unit 140 is configured to prevent disabling device 100 from interfering with the standard operation of target device 190 by preventing capacitive loading of the signals used by target device 190.

As mentioned above, power supply 110 is configured to charge central energy storage unit 120. In accordance with an exemplary embodiment, the power supply comprises two separate power supplies: a low voltage supply 112 and a high voltage supply 113. In another exemplary embodiment, power supply 110 comprises a single supply.

In accordance with one exemplary embodiment, high voltage power supply 113 is configured to have a maximum voltage of less than 75 volts. In another exemplary embodiment, high voltage power supply 113 is configured to have a maximum voltage of 20 to 75 volts. Furthermore, high voltage impulse power supply 113 may have any voltage level that is suitable for charging central energy storage unit 120. In an exemplary embodiment, high voltage power supply 113 is configured to charge central energy storage unit 120. In one exemplary embodiment, high voltage power supply 113 is an impulse power supply, such as, for example, comprising a low ESR MOSFET, gate switching circuit, and a power supply (for example, an LT3466). Nevertheless, other suitable power supplies may also be used. An advantage of using such relatively low voltage power supplies is that the power supply is typically relatively small. For example, power supply 110 may be smaller than 60 square millimeters, although any size may be selected to suit the intended purpose.

In an exemplary embodiment, low voltage power supply 112 is configured to be used to self test whether all the circuit elements and all the discharge pathways are functioning correctly. This is helpful in verifying that a subsequent attempt to disable the circuit will be successful. Furthermore, low voltage power supply 112 may also be configured for use in preconditioning the circuit.

In accordance with various aspects of the present invention, preconditioning is used by integrated circuit disabling device 100. Preconditioning may, for example, involve preloading one or more circuit components. Stated another way, preconditioning may, for example, provide all or some of the energy required to cause current flow in the target signal path. In one exemplary embodiment, the preconditioning charges the circuit components, for example, diodes and transistors. Although any suitable current levels may be used, by way of example, the preconditioning current may be 10 mA, in contrast to a destruct discharge in the range of 20-80 Amps. Thus, the preconditioning current may be on the order of 100-10,000 times smaller than the destruct discharge current.

Preconditioning facilitates using a lower amount of energy to disable target device 190 than would otherwise be used to achieve the same results without preconditioning of the same device. In typical devices such as diodes and transistors, there is a threshold voltage of 0.3 V or 0.7 V, or the like, and when a voltage is applied to the device, it takes a finite period of time before the device turns on. That finite period of time is associated with this threshold voltage. Thus, without preconditioning, an energy "spike" will not be as effective at passing rapidly through a device if a portion of that energy "spike" is employed in turning on the device. Therefore, in accordance with various exemplary embodiments of the present invention, target device 190 and/or portions thereof are preconditioned before discharging central energy storage unit 120. This makes more effective use of the energy stored in central energy storage unit 120 and facilitates use of a lower voltage power supply, and smaller (lower capacitance and physically smaller) capacitors.

In an exemplary embodiment, the disabling voltage level is low enough that when target device 190 is disabled, it does not cause sparks and is operationally safe in a flammable environment.

In accordance with various exemplary embodiments of the present invention, integrated circuit disabling device 100 is configured to disable one or more of many different integrated circuits and/or destroy components thereon. For example, target device 190 may comprise at least one of a memory circuit, a processor, a regulator, a controller, an FPGA, an FIFO, an OpAmp, communication chips, RF devices, gates, and/or the like. These devices are typically disabled by the destruction of one or more components in the integrated circuit. For example, target device 190 may be an FPGA or micro-controller which is disabled by destroying one or more circuits used in the equipment. The components which may be destroyed may comprise, for example, BJT transistors, FET transistors, diodes, and/or any other semiconductor device.

In one exemplary embodiment, target device 190 is a digital integrated circuit. In other exemplary embodiment, target device 190 is an analog integrated circuit. Further more, target device 190 may comprise any circuit, electronic device, or electrical component.

Figure 2:
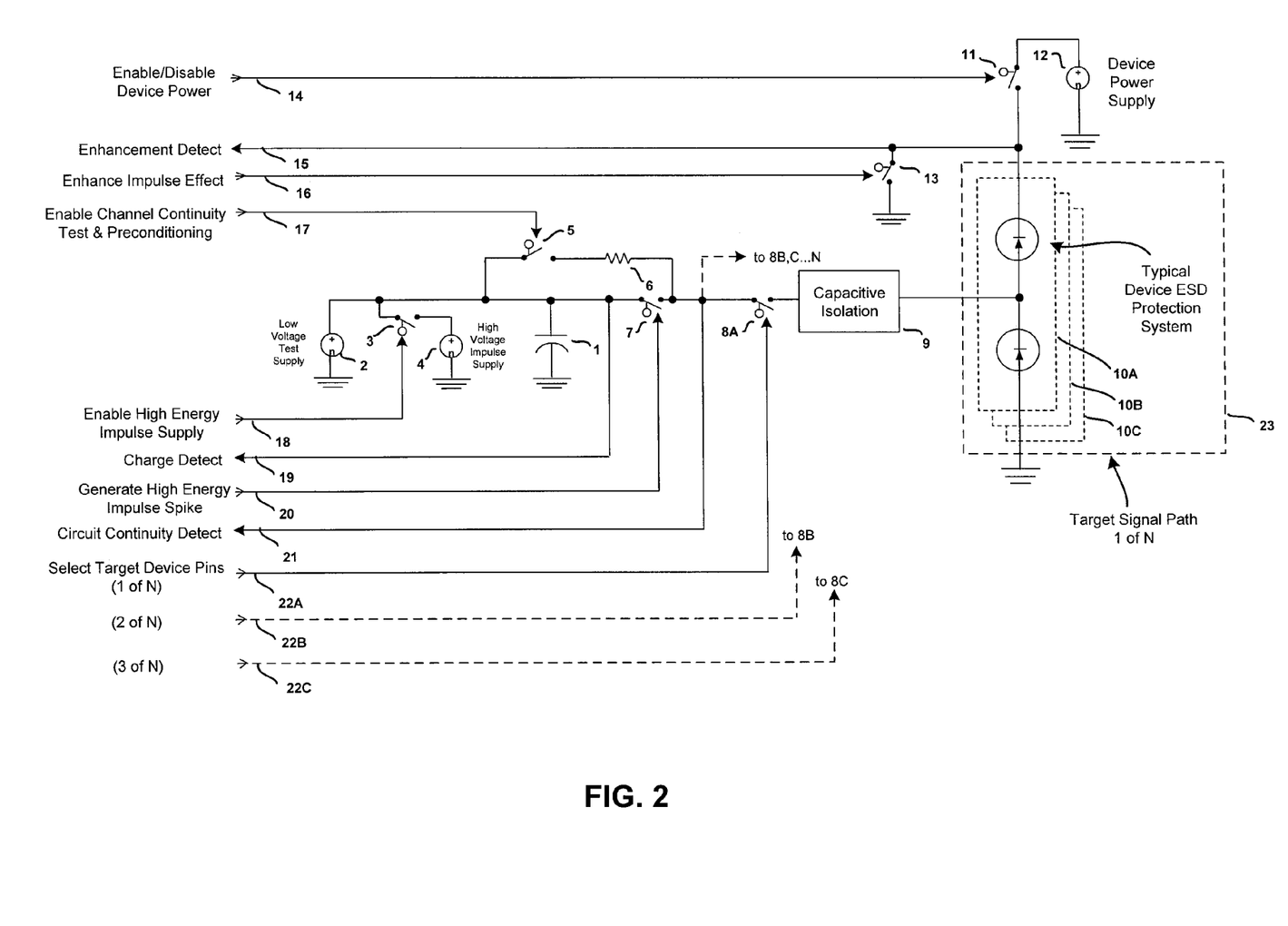
FIG. 2 illustrates an integrated circuit disabling device, according to another exemplary embodiment.

In accordance with an exemplary embodiment, integrated circuit disabling device 100 is configured to disable target devices with a smaller square footage and/or volume than existing devices employed for destroying circuits. For example, the space associated with disabling device 100 may be as small as 169 mm$^2$ and/or 260 mm$^3$. Moreover, the space associated with each unique target signal path (not including the target), e.g., capacitive isolation unit 140 and switch 8, may be on the order of 50 mm$^2$ and/or 70 mm$^3$. These sizes are provided by way of a non-limiting example of the dramatic difference in size compared to existing devices employed for destroying circuits which are generally much larger.

In reference to FIG. 1, in an exemplary embodiment, a controller (not shown) is connected to integrated circuit disabling device 100 and/or target device 190. The controller may be multiple controllers or one controller. The controller may further comprise sensors, sensor logic, and/or the like. The controller(s) may be configured to detect the charge on the capacitor(s), to open and close switches, to test the workability of the various switches and components of integrated circuit disabling device 100, to test the target signal path, to precondition target device 190 or portions thereof, and/or to discharge the capacitor (enable an energy impulse event) to disable target device 190. In one exemplary embodiment, the controller is the same controller that controls other devices on the board.

In various exemplary embodiments, the controller is configured to receive input commanding that the target device be destroyed. The controller may further direct which of the target signal paths will be "pulsed", and/or the order in which the target signal paths will be pulsed. In an exemplary embodiment, each target signal path is associated with one pin of the target device. In other embodiments, target signal paths may not be associated with a "pin." In some exemplary embodiments, all of the pins (or in other words, the paths associated with the pins) will be destroyed, while in other exemplary embodiments, only some of the pins will be destroyed.

The target device may comprise one or more electronic elements that are to be destroyed. Some of these elements may be on one target signal path, and others may be on other target signal paths. In accordance with various exemplary embodiments of the present invention, one or more individual electronic elements may be destroyed on a single path with a single pulse. Furthermore, additional subsequent pulses may be used on the same signal path. In particular, a first pulse may be positively charged and a second pulse may be negatively charged. In that particular case, it is possible that some elements would be destroyed by the first pulse and other elements might be destroyed by the second pulse. This may arise in a variety of circumstances, for example, when a signal path includes an oppositely oriented pair of diodes. In addition, although the controller may cause a single pulse to be directed at only one target signal path at a time, in other exemplary embodiments, the controller may cause a single pulse to be directed at more than one target signal path at the same time.

In an exemplary embodiment and with reference to FIG. 2, the controller may be configured to communicate with disabling device 100 through various signals. Some of the signals that the controller may send or receive include: Enable/Disable Device Power 14, Enhancement Detect 15, Enhance Impulse Effect 16, Enable Channel Continuity Test & Preconditioning 17, Enable High Energy Impulse Supply 18, Charge Detect 19, Generate High Energy Impulse Spike 20, Circuit Continuity Detect 21, and Select Target Device Pins 22A, 22B, 22C, and the like. The purpose or use of these signals will be described herein in connection with a description of the operation of an exemplary embodiment of the present invention. Nevertheless, it should be understood that any suitable control signals and/or combination thereof may be used to control the operation of disabling device 100. In an exemplary embodiment, the controller is a Luminary Micro LM3S811, but any suitable controller may be used.

Figure 3:
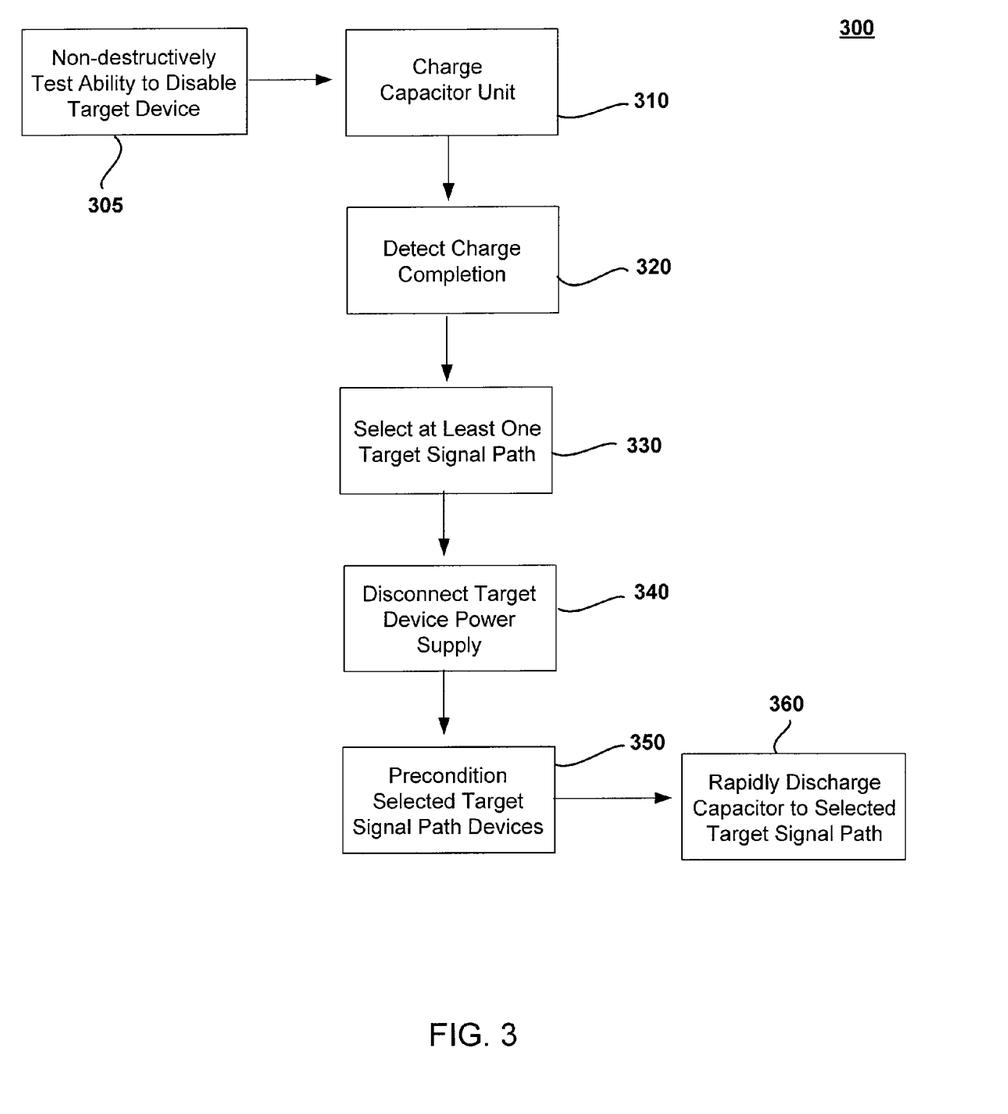
FIG. 3 illustrates a flow chart of a disabling device method, according to another exemplary embodiment.

It is an objective of the invention to disable an integrated circuit so that the circuit components will no longer be usable. With reference to FIG. 1 and FIG. 3, an exemplary method of disabling an integrated circuit is now described. To successfully disable an integrated circuit, it is important that integrated circuit disabling device 100 be able to access the target signal path. In an exemplary embodiment, disabling device 100 is configured to test its ability to disable the target device (step 305) by non-destructively applying power from integrated circuit disabling device 100 to a selected target signal path in such a manner as to assure that all the circuit elements are functioning properly.

In an exemplary embodiment, the testing of the ability of disabling device 100 to disable target device 190 may comprise one or more of the following steps. Low voltage test supply 2 is tested by detecting the charge (using charge detect 19) across capacitor 1 when switches 3, 5, and 7 are opened. In this manner, low voltage test supply 2 is isolated with capacitor 1, and if functioning, the voltage sensed by Charge Detect 19 across capacitor 1 will be the voltage of the low voltage test supply 2.

The high voltage impulse power supply 4 is tested by detecting the charge (using Charge Detect 19 again) across capacitor 1 when switches 5 and 7 are open and switch 3 is closed. Capacitor 1 should charge to the full voltage of high voltage impulse power supply 4 when functioning properly.

To test the path continuity of integrated circuit disabling device 100, switches 3 and 5 are open and switch 7 is opened and closed. In this manner, the device under test is exposed at most to a low voltage signal in the course of testing switch 7; however, this tests the function of switch 7 itself. Continuity exists if when switch 7 is closed the circuit continuity detect signal reflects approximately the voltage of low voltage test supply 2.

To test the target signal path, switches 3, 5, and 8 are closed and switch 7 is opened. Thus, disabling device 100 is configured to allow current to flow during this test from capacitor 1 but through a current limiting device 6. Current limiting device 6 is, for example, a resistor, a current limiting diode, or any other device that is configured to limit the current flow to the target device. In this manner the target signal path is being exposed to power from the device that may in the future be used to destroy elements on that path, but at a non-destructive level during this test. In this step, the voltage detected at Circuit Continuity Detect 21 can be compared to an expected voltage related to the current flow through current limiting device 6. If the target signal path is such that current can flow through that path, the detected voltage will be approximately the same as the expected voltage. On the other hand, if there is an open or short in the target signal path that might prevent disabling device 100 from being able to disable target device 190, the voltage detected at Circuit Continuity Detect 21 may be significantly higher or lower than the expected voltage.

When properly working, Enhancement Detect 15 will sense the full voltage of device power supply 12 if switch 13 is open, and switch 11 closed. Also, if switch 13 is closed and switch 11 is opened, Enhancement Detect 15 will sense ground voltage. Switch 11 is controlled from Enable/Disable Device Power 14 and switch 13 is controlled from Enhance Impulse Effect 16. In this manner the destruct enhancement circuitry can be tested before it is actually used.

Thus, disabling device 100 and its ability to disable target device 190 may be tested in a non destructive manner before it is called upon, if ever, to destroy the target device. This testing may be run at start-up of the target device, periodically, on demand, and/or the like. It will be appreciated that other specific embodiments may be used to test the function and integrity of the device 100 and the target signal pathways to insure the ability to disable the target device.

The method for disabling an integrated circuit may further comprise the step of charging the central energy storage unit (step 310). Central energy storage unit (in this case capacitor) 1 is charged by high voltage power supply 113. This may occur, for example, by closing switch 3, which places the voltage of high voltage impulse supply 4 across capacitor 1. Switch 3 may be closed by a signal from Enable High Energy Impulse Supply 18.

The charging may continue until charge completion is detected (step 320). The charge completion may be detected, for example, by Charge Detect 19. Thus, if the charge sensed by Charge Detect 19 matches the expected charge, then the capacitor is ready to be discharged.

In accordance with an exemplary step in the method of disabling the target device, at least one target signal path is selected (step 330). This may occur by a signal to one of switches 8A, 8B, 8C, etc., from Select Target Device Pins 22A, 22B, 22C, etc.; where there may be N switches to control access to N target signal paths. As discussed herein, more than one target signal path may be selected at a time or just a single target signal path may be selected.

In another exemplary step in the method of disabling the target device, the target device power supply is disconnected (step 340). The target device power supply may be disconnected by opening switch 11 with a signal from Enable/Disable Device Power 14, and closing switch 13 with a signal from Enhance Impulse Effect 16. This connects the power supply node of target device 23 to ground.

Disconnecting device power supply 12 enhances the disabling effect of disabling device 100 by effectively increasing the destructive voltage available from the central energy storage unit by a value nearly equal to the voltage of device power supply 12. Explained another way, disconnecting the device power supply facilitates using a lower voltage on capacitor 1 but still obtaining the same disabling/destructive results. Furthermore, it is noted that similar (albeit reduced) beneficial results may be obtained by merely reducing the voltage provided from the device power supply instead of making the voltage zero. This might be accomplished, for example, through use of a variable power supply, voltage divider, and/or the like. Thus, any method of reducing or eliminating the device power supply prior to disabling the target device may be used. It is additionally noted that disabling of target device 190 may still be accomplished without reducing or eliminating the device power supply.

Moreover, disconnecting the device power supply from a power input to target device 190 and connecting that power input to ground may have the additional benefit that the device power supply will not be supplying power through destroyed devices after a pulse has been sent down one or more target signal paths. This benefit can be better appreciated by noting that the destroyed devices may sometimes appear as a short, and that if multiple devices are destroyed, a significant amount of power may flow through these destroyed devices. This draw of power could otherwise adversely affect the ability of disabling device 100 to continue destroying devices and or create unwanted heat in target device 190. Thus, disconnecting the device power supply may facilitate destroying multiple devices.

In accordance with further steps in the method of disabling a target device, the target signal path devices are preconditioned (step 350). In an exemplary embodiment, preconditioning involves applying a relatively small "threshold voltage" to one or more of any target signal path components that have threshold voltages so that the target signal path is open or nearly open prior to discharge. Preconditioning may be accomplished, for example, by closing switch 5 which allows a small controlled preconditioning current to begin to flow through the static protection structures 10 of the target signal path to ground. Switch 5 may be closed by a signal on Enable Channel Continuity Test & Preconditioning 17. Without preconditioning, the energy envelope of the impulse spike may be severely degraded thus increasing the difficulty of disabling the target device. Conversely, with preconditioning, it is possible to use significantly lower voltage at the central energy storage unit to obtain the same destruction, or to use the same voltage but obtain more damage to devices than without preconditioning.

The method of disabling a target device further comprises the step of rapidly discharging the central energy storage unit through the selected target signal path (step 360). In an exemplary embodiment, a current of between 10 and 200 Amps is discharged into the target device. In other exemplary embodiments between 20 and 80 Amps, or between 20 and 40 Amps may be discharged into target device 190. Furthermore, any suitable amount of current may be discharged.

The central energy storage unit is discharged very rapidly. For example, switch 7 may be briefly toggled closed and then open again by Generate High Energy Impulse Spike 20. In an exemplary embodiment, the switch may be closed for less than 100 μs, in another exemplary embodiment, for less than 1 millionth of a second, for less than 800 ns, or for a period of time between 10 ns and 100 ms. Moreover, any suitable duration may be used for discharging the capacitor. In one exemplary embodiment, the entire central energy storage unit is discharged in 75 μsec. In other embodiments the central energy storage unit is not entirely discharged before switch 7 is opened again.

Thus, switch 7 may comprise any switch that is configured to switch on and off in this short duration and that can handle the power levels associated with the disabling of the target device. In one exemplary embodiment, switch 7 comprises a very low ohm MOSFET, such as a FDC5614, that is configured to provide an very rapid turn on.

The pulse from central energy storage unit is applied to any circuit elements it encounters along the target flow path. In one embodiment, the circuit elements are the static protection structures 10. In another embodiment, the circuits are any devices located near the input and/or output pins of the package. In another embodiment, the circuits comprise any device that has an input and/or an output.

The pulse may deliver an uncontrolled extremely high energy impulse of current to the target device causing instantaneous destruction. In exemplary embodiments, the pulse has a very narrow wave form. For example, the components may be selected such that the pulse has a rise time of less than 20 ns, or even less than 10 ns. Furthermore, the pulse duration may be less than 100 μs. In addition, the maximum voltage of the spike may reach 75V, and even 40V, or 30V in various exemplary embodiments. Thus, in an exemplary embodiment, the dV/dt rise time may be characterized as having greater than a 1.5 V/ns rise time, and in some embodiments even greater than 3 V/ns, and even greater than 4 V/ns. Nevertheless, this disclosure is not limited to a specific dV/dt, specific rise time, or specific pulse durations or maximum voltages. Instead, these are provided as examples of a pulse that very rapidly discharges the central energy storage unit. It should be understood that the dV/dt depends on the reaction speed of the central energy storage unit, and the other connected components, including the configuration of the target device.

The high energy short duration pulse may be configured to destroy one or more electronic devices. These electronic devices may include one or more of: static protection structures (e.g. diodes), input structures, output structures, input/output structures, and any device that has an input and an output. Moreover, these electronic devices may be any device near the bond pads associated with input or output pins of the target device. In short, any devices along the target signal path may be destroyed, however, in accordance with various exemplary embodiments, it is those devices that are first encountered along that path that are most likely to be destroyed.

Central energy storage unit may be recharged rapidly and another pulse may be sent to the same or another target signal pathway. Furthermore, disabling device 100 may be configured to test the target signal pathway to verify destruction of one or more elements on that path. This can be verified by Circuit Continuity Detect 21 with switches 3, 5, and 8 closed and switch 7 open. If elements on the target signal flow path were destroyed, the voltage sensed at Circuit Continuity Detect 21 will be significantly different from the self test value before the pulse.

Thus, in one exemplary embodiment and with reference to FIG. 2, the disabling of the target device occurs with the following steps. Switch 3 is closed and capacitor 1 is charged. When capacitor 1 is fully charged to the voltage of high voltage impulse supply 4, the target signal path is selected by closing switch 8. The regular device power supply is detached by opening switch 11 and the target device is grounded by closing switch 13. The target signal path is preconditioned by closing switch 5, allowing a limited current to flow through the target signal path. The energy impulse stored in capacitor 1 is applied to the target device by closing switch 7. Switch 7 is closed briefly while the energy impulses is delivered, then opened so that capacitor 1 can recharge and a new target signal path can be selected by switch 8.

Other methods of controlling the disabling of target device 190 and various circuit layouts may be used in accordance with the principals described in this specification. Moreover, the steps may be performed in different orders and combinations. Thus, any method for preconditioning, for enhancing, and for destroying circuit elements with a spike of energy may be used.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, couple may mean that two objects are in communication with each other, and/or communicate with each other, such as two pieces of software, and/or hardware, or combinations thereof. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

It should be appreciated that the particular implementations shown and described herein are illustrative of various embodiments including its best mode, and are not intended to limit the scope of the present disclosure in any way. For the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

While the principles of the disclosure have been shown in embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

We claim:

1. A method for intentionally permanently disabling a target device, wherein said target device comprises an integrated circuit having one or more electronic devices, wherein disabling said target device comprises destroying at least one of said one or more electronic devices, wherein said target device comprises at least one target signal path, the method comprising the steps of:

charging at least one capacitor in an integrated circuit disabling device;

selecting at least one target signal path associated with said target device for disabling said target signal path and connecting said integrated circuit disabling device to said target signal path;

preconditioning the selected at least one target signal path of said target device by applying a preconditioning current prior to discharging said at lease one capacitor; and rapidly discharging said at least one capacitor to said selected target signal path, wherein said discharging applies a shaped high energy impulse to destroy the one or more electronic devices of said target device.

2. The method of claim 1, wherein said at least one capacitor has a capacitance of Less than 20 μF and is a low ESR capacitor.

3. The method of claim 1, wherein said at least one capacitor is a multi-layer non-polarized ceramic capacitor.

4. The method of claim 1, wherein said at least one capacitor has a capacitance of less than 4 μF and an ESR of 0 to 500 mΩ.

5. The method of claim 1, further comprising the steps of:
non-destructively testing the ability of a destruct circuit to disable a target device at least once before attempting to disable said target device.

6. The method of claim 5, wherein non-destructively testing further comprises the steps of:
applying a relatively small current to said selected target signal paths by connecting a high voltage power source through a current limiter; and
sensing whether said relatively small current flowed as expected.

7. The method of claim 5, wherein non-destructively testing further comprises the steps of:
testing the ability of a low voltage supply to charge said capacitor to the full voltage of said low voltage supply;
testing the ability of a high voltage impulse supply to charge said capacitor to the full voltage of said high voltage impulse supply;
testing to ensure that a circuit to ground exists on a selected target pathway by sensing the voltage differential caused by a current flow from said at least one capacitor through a current limiting device and through the target device; and
testing to see if a destruction enhancement switch isolates a power input to the target device from its normal power supply and connects said power input to ground.

8. The method of claim 1, wherein said one or more electronic devices comprise at least one of: static protection structures, input structures, output structures, input/output structures, any device that has an input and an output, and any device near the bond pads associated with input or output pins of the target device.

9. The method of claim 1, further comprising the step of disconnecting the device power supply from a power input to the target device and connecting said power input to ground; wherein said disconnecting step enhances target device disablement.

10. The method of claim 1, wherein said at least one capacitor is charged by a power supply; wherein said power supply further comprises:
a low voltage test supply that is equal to or less than the power supply for the target device under normal operation; wherein said low voltage test supply is configured to test the target device; and
a high voltage impulse supply, wherein said high voltage impulse supply is configured to be used during part of the self test and during charging of the capacitor; wherein either said low voltage test supply or said high voltage impulse supply is configured to for preconditioning the target device.

11. The method of claim 1, wherein said discharging step is configured to destroy multiple target devices attached to one of said target signal paths, simultaneously.

12. The method of claim 1, wherein said charging and discharging steps further comprise the steps of charging said capacitor with a positive potential, discharging said positive potential; and separately charging said capacitor with a negative potential and discharging said negative potential.

13. The method of claim 1, further comprising detecting when said at least one capacitor is charged.

14. A method for intentionally permanently disabling a target device, wherein said target device comprises an integrated circuit having one or more electronic devices, wherein disabling said target device comprises destroying at least one of said one or more electronic devices, wherein said target device comprises at least one target signal path, the method comprising the steps of:
charging at least one capacitor in an integrated circuit disabling device;
disconnecting a device power supply from a power input to the target device and connecting said power input to ground;
selecting at least one target signal path associated with said target device for disabling said target signal path and connecting said integrated circuit disabling device to said target signal path; and
rapidly discharging said at least one capacitor to said selected target signal path, wherein said discharging applies a shaped high energy impulse to destroy the one or more electronic devices of said target device.

15. The method of claim 14, further comprising the steps of:
preconditioning the selected at least one target signal path of said target device by applying a preconditioning current prior to discharging said at least one capacitor.

16. The method of claim 14, further comprising the step of disconnecting the device power supply from a power input to the target device and connecting said power input to ground; wherein said disconnecting step at least one of: (1) enhances target device disablement and (2) facilitates destruction of multiple electronic devices.

17. The method of claim 14, wherein said at least one capacitor is a multi-layer non-polarized ceramic capacitor, wherein said at least one capacitor has a capacitance of less than 4 μF and an ESR of 0 to 500 mΩ.

18. The method of claim 14, further comprising the steps of:
non-destructively testing the ability of a destruct circuit to disable a target device at least once before attempting to disable said target device.

19. The method of claim 14, wherein said charging and discharging steps further comprise the steps of charging said capacitor with a positive potential, discharging said positive potential; and separately charging said capacitor with a negative potential and discharging said negative potential.

20. The method of claim 14, further comprising detecting when said at least one capacitor is charged.

21. The method of claim 14, wherein said discharging rise time is characterized by a dV/dt of greater than 1.5 volts/nanosecond.

22. A system for intentionally permanently disabling an integrated circuit device comprising:
a power supply;
a central energy storage unit electrically connected to said power supply;
a target device electrically connected to said central energy storage unit; said target device comprising the integrated circuit device which comprises at least one electronic device, wherein said target device comprises at least one target signal path;
a preconditioning circuit configured to precondition said at least one target signal path of said target device by applying a preconditioning current prior to discharging said central energy supply unit; and a controller configured to destroy at least one of said at least one electronic device by charging said central energy storage unit, and rapidly discharging said central energy storage unit to said at least one target signal path, wherein said discharging applies a high energy impulse to destroy said at least one electronic device of said target device.

23. The system of claim 22, further comprising:

a disablement enhancement circuit configured to disconnect the device power supply from a power input to the target device and connect said power input to ground prior to discharging of said central energy supply unit.

24. The system of claim 22, wherein said central energy storage unit comprises at least one capacitor, wherein said at least one capacitor is a multi-layer non-polarized ceramic capacitor, wherein said at least one capacitor has a capacitance of less than 4 µF and an ESR of 0 to 500 mΩ.

25. The system of claim 22, wherein said discharging rise time is characterized by a dV/dt of greater than 1.5 volts/nanosecond.

* * * * *

UNITED STATES PATENT AND TRADEMARK OFFICE
CERTIFICATE OF CORRECTION

| | | |
|---|---|---|
| PATENT NO. | : 7,532,027 B2 | Page 1 of 1 |
| APPLICATION NO. | : 11/864625 | |
| DATED | : May 12, 2009 | |
| INVENTOR(S) | : Robert Lazaravich et al. | |

It is certified that error appears in the above-identified patent and that said Letters Patent is hereby corrected as shown below:

In claim 2, line 2, "Less" should be changed to -- less --.

Signed and Sealed this

Seventh Day of July, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,532,027 B2 | |
| APPLICATION NO. | : 11/864625 | |
| DATED | : May 12, 2009 | |
| INVENTOR(S) | : Robert Lazaravich et al. | |

It is certified that error appears in the above-identified patent and that said Letters Patent is hereby corrected as shown below:

Column 11, in claim 2, line 2, "Less" should be changed to -- less --.

This certificate supersedes the Certificate of Correction issued July 7, 2009.

Signed and Sealed this

Fourth Day of August, 2009

JOHN DOLL
*Acting Director of the United States Patent and Trademark Office*